Aug. 30, 1938.  R. J. I. VISSER  2,128,626
HYDRAULIC SHOCK ABSORBER
Filed Sept. 14, 1936
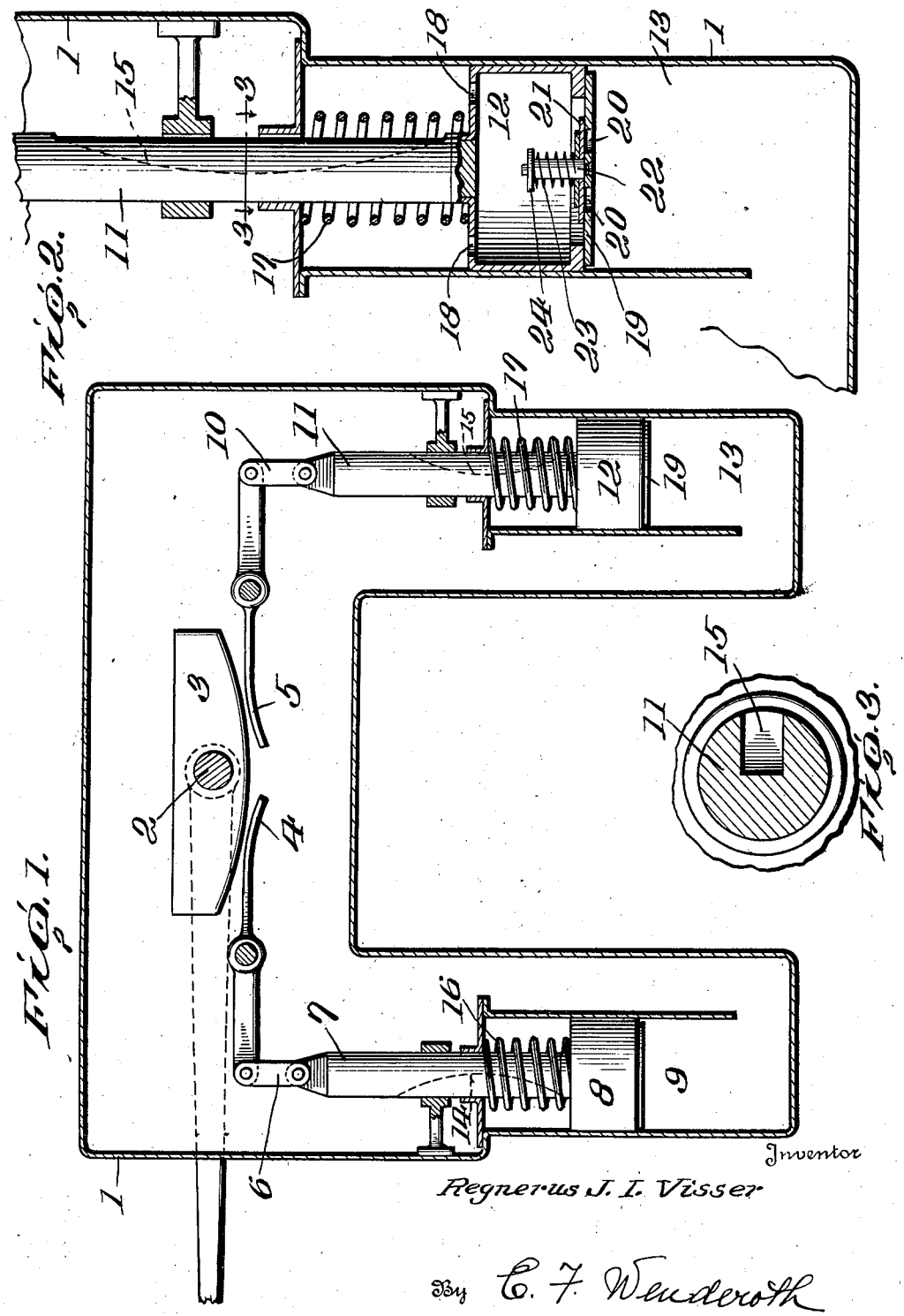
Inventor
Regnerus J. I. Visser
By C. F. Wenderoth
Attorney Patented Aug. 30, 1938

2,128,626

UNITED STATES PATENT OFFICE 2,128,626

HYDRAULIC SHOCK ABSORBER

Regnerus Josephus Ignatius Visser, Amsterdam, Netherlands

Application September 14, 1936, Serial No. 100,776
In the Netherlands June 23, 1936

4 Claims. (Cl. 188—88)

The invention relates to a hydraulic shock absorber with two single-acting cylinders in which a piston located in the one cylinder brings about the shock-absorbing action in one direction, and a piston in the other cylinder brings about the shock absorbing action in the opposite direction by expelling the liquid through a comparatively narrow passage in the cylinder wall.

The invention provides a very simple construction for obtaining a progressive action of the shock absorber in such a way that the resistance increases in proportion to the length of the stroke and that the resistance progressively decreases during the movement of the piston from its end position towards the central position.

According to the invention the passage for each cylinder is formed by a groove provided in a rod, which rod is moving along with the said pressure piston and which projects, fitting more or less snugly, through an opening in the cylinder wall, the said groove being formed in such a way that the passage is widest in the central position of the piston, narrowing towards the ends.

The invention is further explained with the aid of the drawing in which

Fig. 1 is a diagrammatical section of a shock absorber for a vehicle;

Fig. 2 is a section of one of the cylinders with piston of the shock absorber according to the invention.

Fig. 3 is a detailed cross sectional view taken on the section line 3—3 of Fig. 2.

A shaft 2 is rotatably located in a casing 1 which may be attached to the frame of the vehicle, while on a portion of said shaft 2 located outside the casing there is secured the lever which is to be connected with the axle-part of the vehicle. Inside the casing a two-armed lever 3 is secured on the shaft 2, which lever 3 when the shaft 2 is turned in one direction, presses down one arm of a two-armed lever 4, while when the said shaft is turned in the opposite direction it depresses one arm of another two-armed lever 5. The other arm of the lever 4 is connected by means of a connecting rod 6 with the piston rod 7 of a piston 8 adapted to reciprocate in a cylinder 9 located in the casing 1. The other arm of the lever 5 is connected in the same way by means of a connecting rod 10 with the piston rod 11 of a piston 12, adapted to reciprocate in a cylinder 13 also located in the casing 1.

Each one of the piston rods 7 or 11 is passed through an opening in the cover of a cylinder 9 or 13 and moreover each of the said rods is provided with a longitudinal groove 14 and 15, respectively which forms a passage between the space below and the space above the cylinder cover. The cross section of the said groove is largest in the centre, narrowing from the said centre towards the ends.

When the shock absorber is in its central position the centre of the said groove is on a level with the cylinder cover, so that in this position the liquid will meet with the least resistance.

Between each of the pistons 8 and 12 and the cover of the cylinder there is provided a spring, 16 and 17, respectively. As shown in Fig. 2 the piston consists of a hollow body the upper wall of which is provided with apertures 18, while the hollow piston body is closed at the bottom by a plate 19 provided with apertures 20, which at the compression stroke are closed by a disk valve 21. A valve guiding means 22 is provided in the plate 19, while the valve spring 23 is held at the top by a ring 24 provided on the said guiding means.

When the shaft 2 is turned in a clockwise direction, the piston 12 is moved upwardly and the liquid is expelled from the cylinder 13 through the relatively large passage formed by the groove. This passage becomes smaller the farther the said movement is continued, so that the shock absorbing action increases successively until at the end of the stroke the entire passage is closed. If the shaft is turned in an anti-clockwise direction, the liquid in the cylinder 9 above the piston 8 is pressed in the same manner out of the cylinder 9 through the groove 14 provided in the piston rod 7 thus producing a shock absorbing action in the opposite direction.

At the return movement, when, e. g., the piston 8 has reached its highest position, the piston 12 will have been moved to its lowest position by the spring 17, so that at the beginning of the return movement, the piston 12 will have to press the liquid through the passage formed by a part of the groove having the narrow cross section, while during continued movement the resistance is successively lowered, as the passage grows larger. With a return movement in the opposite direction the action in the other cylinder 9 is the same. The return movement towards the central position therefore is braked more strongly at the beginning, which braking action decreases gradually towards the central position.

In the central position the braking action of the shock absorber is but slight, as is needed for a good operation.

I claim:

1. A hydraulic shock absorber comprising a pair of cylinders containing a fluid, pistons in said cylinders, means cooperating with said pistons so that a shock in one direction is absorbed by one piston while a shock in the other direction is absorbed by the other piston, piston rods and means on said piston rods controlling the egress of fluid from each cylinder upon movement of said pistons.

2. A hydraulic shock absorber comprising a pair of cylinders containing a fluid, pistons in said cylinders, means cooperating with said pistons so that a shock in one direction is absorbed by one piston while a shock in the other direction is absorbed by the other piston, means movable with said pistons and a groove on each of said movable means permitting egress of fluid from said cylinders.

3. A hydraulic shock absorber comprising a pair of cylinders containing a flud, pistons in said cylinders, means cooperating with said pistons so that a shock in one direction is absorbed by one piston while a shock in the other direction is absorbed by the other piston, means movable with said pistons and a tapering groove on each of said movable means permitting egress of fluid from said cylinders in inverse ratio to movement of pistons from equilibrium.

4. A hydraulic shock absorber comprising a pair of cylinders containing a fluid, pistons in said cylinders, means cooperating with said pistons so that a shock in one direction is absorbed by one piston while a shock in the other direction is absorbed by the other piston, piston rods and a tapered groove on each piston rod permitting greatest egress of fluid at the central position of said pistons and a decreasing egress as the pistons move away from such central position.

REGNERUS JOSEPHUS IGNATIUS VISSER.